Sept. 19, 1933.   O. MITCHELL   1,927,523
SHEET METAL MOUNTING FOR BEARING HOUSINGS AND THE LIKE
Filed April 29, 1932
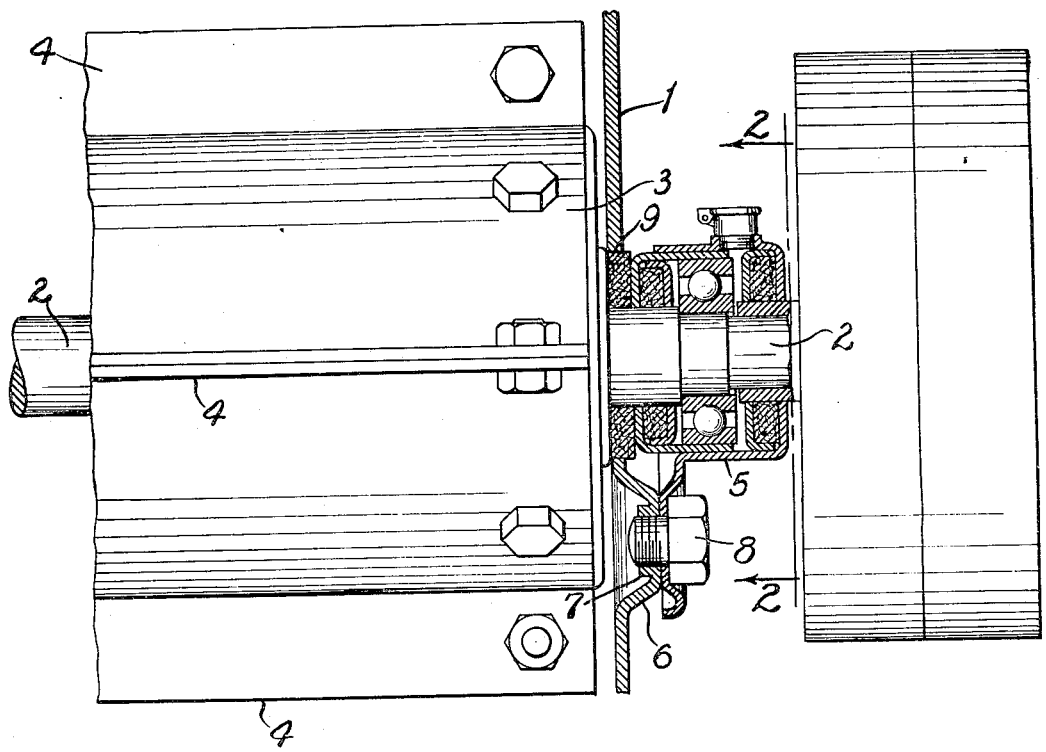
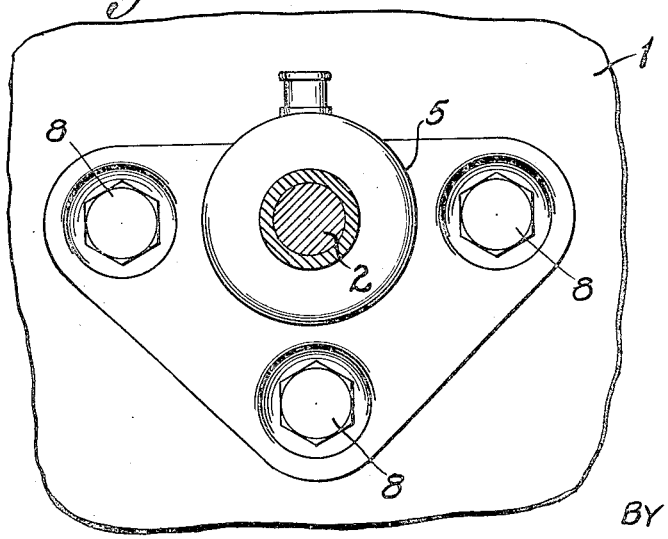
INVENTOR:
ORVILLE MITCHELL
BY Bruce S. Elliott
ATTORNEY Patented Sept. 19, 1933

1,927,523

UNITED STATES PATENT OFFICE 1,927,523

SHEET METAL MOUNTING FOR BEARING HOUSINGS AND THE LIKE

Orville Mitchell, Dallas, Tex.

Application April 29, 1932. Serial No. 608,265

2 Claims. (Cl. 308—22)

This invention relates to certain new and useful improvements in means for securing bearing housings and other parts to sheet metal machinery frames or housings. The invention, while not limited to such application, is more particularly intended for use on cotton treating machinery in which I have substituted sheet metal end plates for the cast iron plates heretofore used on machinery of this class.

It is necessary in these machines for the ends of the revolving cylinders, saw drums, and the like, mounted within the housing, to run fairly close to the end plates through which the shafts of these parts extend. In the case of cast iron end plates, where the casting itself is not of sufficient thickness, it is a simple matter to provide bosses or raised surfaces to receive the cap screws holding the bearings and other parts in place; but in using a sheet metal housing, or supporting end plates, metal of sufficient thickness to provide the necessary strength is very seldom of sufficient thickness to provide the threads necessary for the screws holding the bearings and other parts, mounted on the outer side of the end plates, in position. Furthermore, too much space is required between the sheet metal plates and the ends of the revolving cylinders in order to provide room for the end portions of the screws extending through the metal.

According to my invention, I obviate the difficulties incident to the use of sheet metal end plates or supporting members by stamping or pressing out the metal at the points of applications of the screws so as to provide raised surfaces against which the bearing housings, or other parts to be mounted on the outer side of the plate, are to be secured, then projecting the body of the raised metal rearwardly or toward the inner side of the end plate around a central aperture, and providing the walls of this aperture with screw threads, the construction thus providing a sufficient number of threads for engagement by the screws, and preventing the screws from extending too far inside the housing.

The invention is illustrated in the accompanying drawing in which:

Figure 1 is a sectional view showing the manner of securing the bearing housing for a shaft in the end plate of a machine according to my invention; and Figure 2 is a sectional view on an enlarged scale taken on the line 2—2 of Figure 1 and viewed in the direction of the arrows.

Referring now to the drawing, the numeral 1 indicates one of the end plates of the housing of a cotton machine through which extends a shaft, 2, having any character of rotary member, 3, mounted thereon, which in the illustration is a beating or threshing cylinder comprising a hollow drum having radial blades, 4. The shaft 2 extends through, and is adapted to be supported in a bearing housing, 5, and it is necessary to secure this bearing housing to the end plate 1 on the outer side thereof. It is also necessary, in the interest of rigidity of structure and economy of space, that the end of the drum 3, which is typical of a relatively large number of rotary members mounted within the housing having the end plate 1, should be mounted to run in close proximity to the inner side of said end plate.

It will be clear at a glance that the sheet metal end plate 1 is not of sufficient thickness to provide the necessary purchase for the screws used in securing the bearing housings to the end plate, and that the end of the bearing cylinder 3 would have to be set at a greater distance from the end plate 1 than shown in the drawing, in order to permit the ends of the screws to project beyond the inner side of the end plate without engaging the end of said cylinder.

In order to overcome this difficulty, the end plate 1 is pressed outwardly at each point where a screw is to be applied, so as to form a conical raised portion, 6, and the central portion of the pressed-out metal is then turned inwardly, as indicated at 7, to provide a circular aperture having a cylindrical wall, and the wall of each aperture is then internally screw threaded to adapt it to receive a screw, 8. In practice, I press out and screw thread the metal of the end plate at three points symmetrically arranged on one side of the opening, 9, through which the shaft 2 projects. As shown by Figure 3, the bearing housing 5 is provided with a triangular flange, 10, which at each of its corners is provided with an aperture for receiving a screw 8, and these screws are inserted through said apertures and screwed into the screw-threaded member 7 of each raised portion 6.

By this construction it will be seen that the inwardly directed cylindrical portions 7 are sufficient in depth to provide the necessary screw-threads for the screws 8, and that by pressing out the metal as described, the inner ends of these screws will be prevented from projecting beyond the inner side of the end plate 1.

While I have described and illustrated my invention as applied in mounting bearing housings on sheet metal end plates, it will be apparent that my invention would be equally applicable

I claim:

1. In combination with a sheet metal end plate having a shaft opening therein and provided about said opening with outwardly pressed portions each of which has a central screw-threaded aperture, and a bearing housing for a shaft projected through said opening secured on said pressed-out portions by screws engaging in said apertures, whereby the ends of the screws are prevented from projecting beyond the inner side of the end plate.

2. A sheet metal end plate having a shaft opening therein and the metal whereof is pressed outwardly at symmetrical points around said shaft opening and turned inwardly upon itself to provide a cylindrical member projecting rearwardly in said pressed-out portion, said cylindrical member terminating short of the inner side of the plate and being open ended and provided with interior screw-threads.

ORVILLE MITCHELL.